(12) United States Patent  
Smith

(10) Patent No.: US 10,496,211 B1
(45) Date of Patent: Dec. 3, 2019

(54) FORCE SENSING USING MEASUREMENTS OF AIR PRESSURE AND AIR FLOW

(71) Applicant: Apple Inc., Cupertino, CA (US)

(72) Inventor: John Stephen Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/145,061

(22) Filed: Sep. 27, 2018

(51) Int. Cl.
  *G06F 3/041* (2006.01)
  *G01L 1/26* (2006.01)
  *G01L 1/02* (2006.01)

(52) U.S. Cl.
  CPC .............. *G06F 3/0414* (2013.01); *G01L 1/02* (2013.01); *G01L 1/26* (2013.01); *G06F 3/0418* (2013.01)

(58) Field of Classification Search
  CPC ....... G06F 3/0414; G06F 3/0418; G01L 1/02; G01L 1/26
  See application file for complete search history.

(56) References Cited

U.S. PATENT DOCUMENTS

| | | | |
|---|---|---|---|
| 8,154,527 | B2 | 4/2012 | Ciesla et al. |
| 8,928,621 | B2 | 1/2015 | Ciesla et al. |
| 9,542,589 | B2 | 1/2017 | Thammasouk et al. |
| 9,772,245 | B2 | 9/2017 | Besling et al. |
| 9,886,187 | B2 | 2/2018 | Seo et al. |
| 10,139,975 | B2 | 11/2018 | Shutzberg et al. |
| 10,259,289 | B2 | 4/2019 | Jiang et al. |
| 2017/0038880 | A1* | 2/2017 | Kinzer .................. G06F 1/1684 |
| 2017/0269751 | A1 | 9/2017 | Cho et al. |
| 2018/0048058 | A1 | 2/2018 | Ehman et al. |
| 2018/0138102 | A1 | 5/2018 | Pan et al. |
| 2019/0154522 | A1* | 5/2019 | Mori ....................... B29C 44/02 |

* cited by examiner

*Primary Examiner* — Peter D McLoone
(74) *Attorney, Agent, or Firm* — Brownstein Hyatt Farber Schreck, LLP

(57) ABSTRACT

A mobile communication device includes a housing defining an interior volume and a port connecting the interior volume to an environment exterior to the device. The mobile communication device also includes a display viewable through a surface of the housing, a pressure sensor configured to measure an air pressure within the interior volume, an air flow sensor configured to measure an air flow through the port, and a processor. The processor is configured to determine an amount of force applied to the housing using a measurement of the air pressure by the pressure sensor and a measurement of the air flow by the air flow sensor.

20 Claims, 10 Drawing Sheets

2A

FORCE SENSING USING MEASUREMENTS OF AIR PRESSURE AND AIR FLOW

FIELD

The described embodiments generally relate to a device that can sense force using measurements of air pressure and air flow. More particularly, the described embodiments relate to a device that can determine an amount of force applied to a display surface using a measurement of an air pressure within an interior volume of the device, and a measurement of an air flow between the interior volume and an environment exterior to the device.

BACKGROUND

A device such as a smartphone, tablet computer, or electronic watch may include a touch sensor that indicates a location of a touch on a display surface of the device, and a force sensor that indicates an amount of force applied to the display surface by the touch. Often, the force sensor is a capacitive force sensor. A capacitive force sensor may include first and second electrodes disposed in first and second flex circuits. The flex circuits may be separated by a compressible element or gap. As the amount of force applied to the display increases, the compressible element or gap is compressed and the electrodes disposed in the flex circuits move closer to one another, thereby decreasing the capacitance between the electrodes. The flex circuits may be coupled to a processor that measures, amplifies, and digitizes the capacitance.

SUMMARY

Embodiments of the systems, devices, methods, and apparatus described in the present disclosure are directed to determining an amount of force applied to a housing or display surface of a device. The described systems, devices, methods, and apparatus employ at least a pressure sensor and an air flow sensor. The pressure sensor senses an air pressure within an interior volume of the device (e.g., an interior volume disposed under the display surface and/or under a display or a device stack disposed under the housing or display surface. The air flow sensor senses an air flow between the interior volume and an environment exterior to the device. An amount of force applied to the housing or display surface may be determined using measurements of the air pressure and the air flow.

In a first aspect, the present disclosure describes a device having a housing, which housing may define an interior volume and a port connecting the interior volume to an environment exterior to the device. The device may also include a display viewable through a surface of the housing, a pressure sensor configured to measure an air pressure within the interior volume, an air flow sensor configured to measure an air flow through the port, and a processor. The processor may be configured to determine an amount of force applied to the housing using a measurement of the air pressure by the pressure sensor and a measurement of the air flow by the air flow sensor.

In another aspect, the present disclosure describes a method of determining an amount of force applied to a display surface of a mobile electronic device. The method may include measuring an air pressure within an interior volume of the mobile electronic device; measuring an air flow through a port connecting the interior volume to an environment exterior to the mobile electronic device; and determining the amount of force applied to the display surface using the measurement of the air pressure and the measurement of the air flow.

In still another aspect of the disclosure, a method of notifying a user of a mobile communication device that the mobile communication device has a damaged seal is described. The method may include measuring an air pressure within an interior volume of the mobile communication device; measuring an air flow through a port connecting the interior volume to an environment exterior to the mobile communication device; determining whether a relationship between the measured air pressure and the measured air flow matches an expected air pressure to air flow relationship; and transmitting to the user, in response to determining the relationship between the measured air pressure and the measured air flow does not match the expected air pressure to air flow relationship, a notification indicating that the mobile communication device has the damaged seal.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
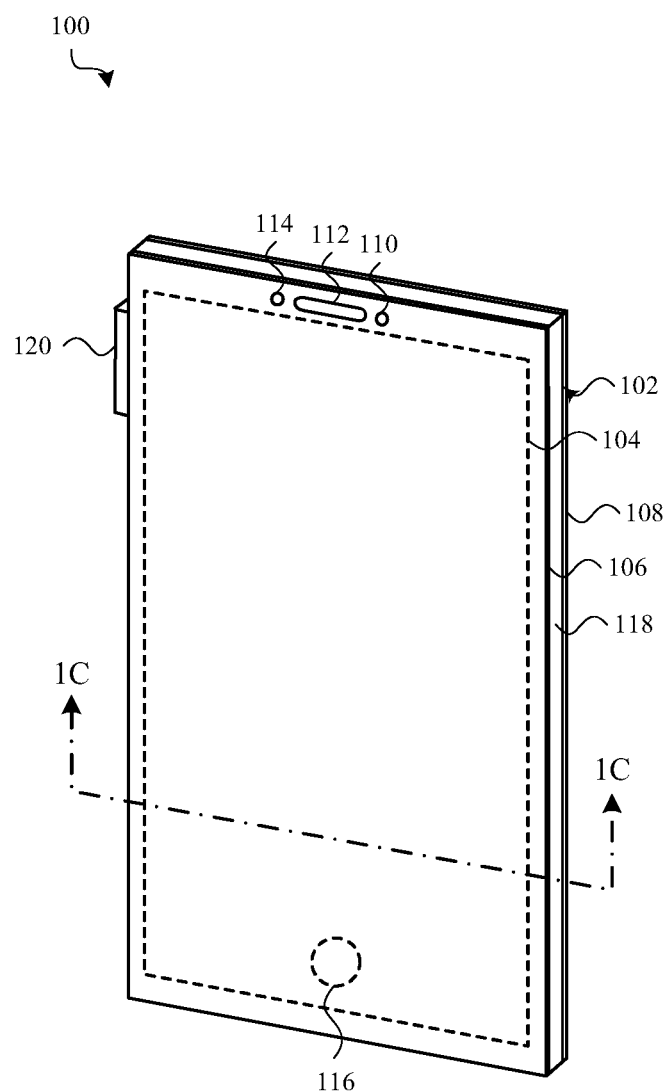
FIGS. 1A-1C show an example of an electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

When the interior volume of an electronic device is sealed, the air pressure within the interior volume can be used to determine (e.g., estimate) an amount of force applied to a surface of the device by a touch. The touch may be a touch with a user's finger or stylus, or a touch by other means. The surface of the device may be any surface that flexes into the interior volume, such as a display surface. One drawback to determining an amount of force applied to a surface of a device using pressure sensing alone is that it is typically not possible to completely seal a device. For example, as the air pressure exterior to the device changes due to changes in altitude, the air pressure inside a completely sealed device may cause one or more components or seals defining the interior volume to deform, break, or leak (e.g., a seal that seals the interior volume from the environment exterior to the device may pop if the interior/exterior pressure difference is too great). Most devices therefore have a port (i.e., a vent) that allows air to exit and re-enter the device. However, the rate at which air exits and re-enters the device (i.e., the vent rate) can vary in an unpredictable manor based on the construction of the device, conditions within the interior volume of the device, the environment in which the device is operated, the condition of the port that provides the venting, and/or the condition of a membrane that prevents liquid water or debris from entering the device. This can make it difficult to determine the amount of force applied to a device using nothing but a pressure measurement, and can make it particularly difficult to determine the amount of force applied to the device when the force is applied for more than an insignificant period of time or increases over time.

The present disclosure describes the use of an air flow sensor, in combination with a pressure sensor, to determine an amount of force applied to a surface of a device. In some embodiments, a temperature sensor or other sensors may also be used to determine an amount of force applied to a surface of a device. The pressure sensor may be used to obtain a measurement of the air pressure within an interior volume of the device. The air flow sensor may be used to obtain a measurement of the air flow between the interior volume and an environment exterior to the device, and in some cases may integrate all air flow through a port (into and out of the interior volume) over a period of time. Integrating all air flow through the port over a period of time enables a size of the interior volume (or a change of size of the interior volume), as affected by an applied force, to be determined. The temperature sensor may be used to obtain a measurement of the temperature within the interior volume. In some embodiments, a spring constant for the surface to which the force is applied (e.g., a display surface of the device) may be obtained based on a location of a touch on the surface. The location of a touch may be determined from an output of a touch sensor of the device.

In some embodiments, a measurement of air pressure, a measurement of air flow, or a relationship between measurements of air pressure and air flow, may be used to determine whether a device has a damaged seal, enabling the device to notify a user of the device that the device has a damaged seal (or take other actions).

Force sensing using an air pressure sensor and an air flow sensor may provide force sensing at a lower cost compared to force sensing solutions that rely on capacitive or resistive force sensors.

These and other embodiments are described with reference to FIGS. 1A-7. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

Figure 1B:
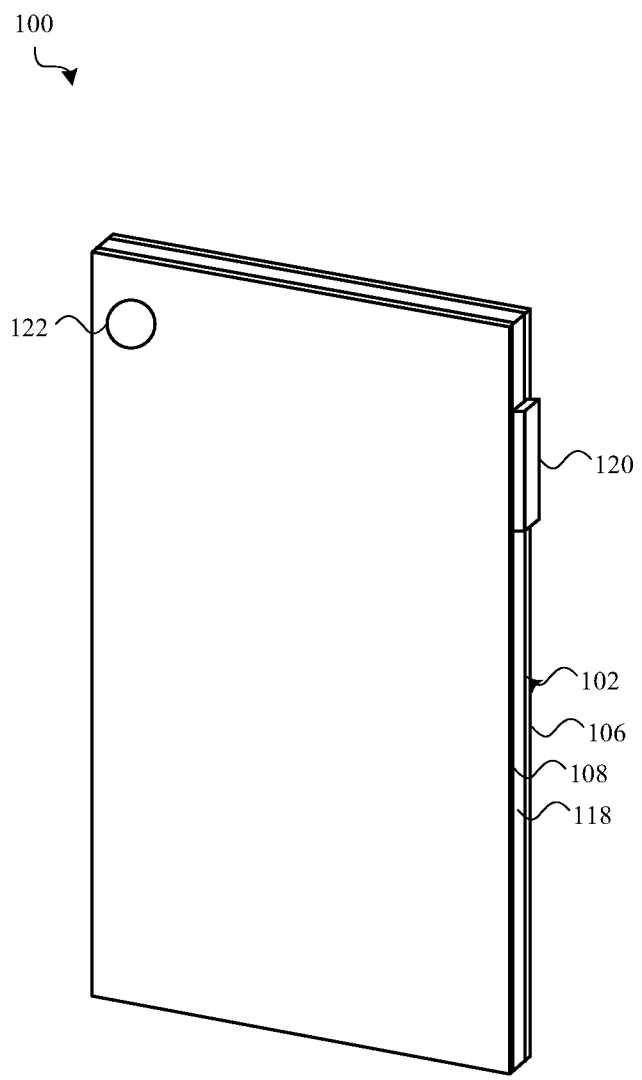
Figure 1C:
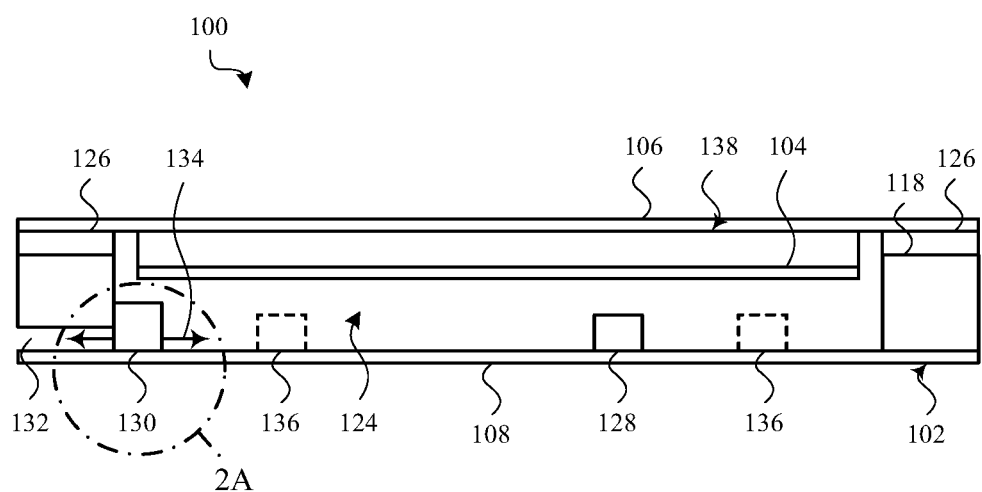

FIGS. 1A-1C show an example of an electronic device or simply "device" 100. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example, a mobile phone, tablet computer, portable computer, portable music player, health monitoring device, portable terminal, or other portable or mobile device. FIG. 1A shows a front isometric view of the device 100; FIG. 1B shows a rear isometric view of the device 100; and FIG. 1C shows a cross-section of the device 100. The device 100 may include a housing 102 that at least partially surrounds a display 104. The housing 102 may include or support a front cover 106 or a rear cover 108. The front cover 106 may be positioned over the display 104, and may provide a window through which the display 104 may be viewed. In some embodiments, the display 104 may be attached to (or abut) the housing 102 and/or the front cover 106.

As shown in FIGS. 1A & 1B, the device 100 may include various other components. For example, the front of the device 100 may include one or more front-facing cameras 110, speakers 112, microphones, or other components 114 (e.g., audio, imaging, or sensing components) that are configured to transmit or receive signals to/from the device 100. In some cases, a front-facing camera 110, alone or in combination with other sensors, may be configured to operate as a bio-authentication or facial recognition sensor. The device 100 may also include various input devices, including a mechanical or virtual button 116, which may be accessible from the front surface (or display surface) of the device 100. The device 100 may also include buttons or other input devices positioned along a sidewall 118 of the housing 102 and/or on a rear surface of the device 100. For example, a volume button or multipurpose button 120 may be positioned along the sidewall 118, and in some cases may extend through an aperture in the sidewall 118. By way of example, the rear surface of the device 100 is shown to include a rear-facing camera 122 or other optical sensor (see, FIG. 1B). A flash or light source may also be positioned along the rear of the device 100 (e.g., near the camera 122). In some cases, the rear surface of the device 100 may include multiple rear-facing cameras.

The display 104 may include one or more display elements including, for example, a light-emitting display (LED), organic light-emitting display (OLED), liquid crystal display (LCD), electroluminescent display (EL), or other type of display element. The display 104 may also include, or be associated with, one or more touch and/or force sensors that are configured to detect a touch and/or a force applied to a surface of the front cover 106.

The various components of the housing 102 may be formed from the same or different materials. For example, the sidewall 118 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of a glass, a crystal (e.g., sapphire), or a transparent polymer (e.g., plastic) that enables a user to view the display 104 through the front cover 106. In some cases, a portion of the front cover 106 (e.g., a perimeter portion of the front cover) may be coated with an opaque ink to obscure components included within the housing 102. The rear cover 108 may be formed using the same material(s) that are used to form the sidewall 118 or the front cover 106. In some cases, the rear cover 108 may be part of a monolithic element that also forms the sidewall 118 (or in cases where the sidewall 118 is a multi-segment sidewall, those portions of the sidewall 118 that are non-conductive). in still other embodiments, all of the exterior components of the housing 102 may all be formed from a transparent material, and components within the device 100 may or may not be obscured by an opaque ink or opaque structure within the housing 102.

FIG. 1C depicts a cross-section of the device 100 shown in FIGS. 1A and 1B. As shown in FIG. 1C, the rear cover 108 may be a discrete or separate component that is attached to the sidewall 118. In other cases, the rear cover 108 may be integrally formed with part or all of the sidewall 118.

The front cover 106 may be mounted to the sidewall 118 to cover an opening defined by the sidewall 118 (i.e., an opening into an interior volume 124 in which various electronic components of the device 100, including the display 104, may be positioned). The front cover 106 may be mounted to the sidewall 118 using fasteners, adhesives, seals, or other components. By way of example, the front cover 106 is shown to be mounted to the sidewall 118 by a gasket 126 that separates the front cover 106 from the sidewall 118. A first adhesive may be disposed between the gasket 126 and the sidewall 118, and a second adhesive (which may have the same or different composition as the first adhesive) may be disposed between the front cover 106 and the gasket 126. The front cover 106 may be at least partially surrounded by the sidewall 118, as shown, or attached to an upper surface of the sidewall 118 such that the front cover 106 sits above the sidewall 118.

The interior volume 124 may be further defined by the rear cover 108, or by a support plate or other housing component positioned between the front cover 106 and the rear cover 108. In some embodiments, a support plate may be coupled to the sidewall 118, or to components thereof, between the front cover 106 and the rear cover 108.

In some embodiments, a display stack or device stack (hereafter referred to as a "stack" 138) including the display 104 may be attached to an interior surface of the front cover 106 and extend into the interior volume 124. In some cases, the stack 138 may include a touch sensor (e.g., a grid of capacitive touch sensing elements formed at the intersections of different electrodes in orthogonal sets of electrodes), or other layers of optical, mechanical, electrical, or other types of components. In some cases, the touch sensor (or part of a touch sensing system) may be configured to detect a touch applied to an outer surface of the front cover 106 (e.g., to a display surface of the device 100). In some cases, a force sensor (or part of a force sensing system) may be positioned within the interior volume 124 below and/or to the side of the display 104. A portion of the force sensor (e.g., a pressure sensor 128) may be positioned within the interior volume 124 and configured to measure an air pressure within the interior volume 124, and another portion of the force sensor (e.g., an air flow sensor 130) may be positioned within the interior volume 124, adjacent a port 132 (or vent) within the housing 102), and configured to measure an air flow 134 through the port 132 (e.g., an integration of all air flow through the port 132 (into and out of the interior volume 124) over a period of time). The port 132 may be a single aperture or multiple aperture port. By way of example, FIG. 1C shows a port 132 within the sidewall 118. The port 132 may allow air trapped within the interior volume 124 to escape and return (exit and re-enter) the interior volume 124. Air may escape, for example, when a user presses on the front cover 106 or elsewhere on the device 100, or when the device 100 is transported to an environment having an air pressure that differs from the air pressure within the interior volume 124. In some embodiments, the air flow sensor 130 may be positioned fully or partially within the port 132. In some embodiments, the force sensor may include only the pressure sensor 128 or only the air flow sensor 130.

The touch sensor may include an array of electrodes that are configured to detect a location of a touch on the front cover 106 using a capacitive, resistive, strain-based, or other sensing configuration. The touch sensor may include, for example, a set of capacitive touch sensing elements, a set of resistive touch sensing elements, or a set of ultrasonic touch sensing elements. When a user of the device touches the front cover 106, the touch sensor (or touch sensing system) may detect one or more touches on the front cover 106 and determine locations of the touches on the front cover 106. The touches may include, for example, touches by a user's finger or stylus. When a user of the device 100 touches or presses on the front cover 106 (e.g., touches or applies a force to the front cover 106), the force sensor may determine an amount of force applied to the front cover 106 by the user. In some embodiments, a force determination operation of the force sensor (or force sensing system) may be triggered in response to the touch sensor detecting a touch on the front cover 106 (or a location of a touch or touch centroid on the front cover 106).

The pressure sensor 128 may include a single pressure sensor, or a set of multiple pressure sensors providing measurements of air pressure from which an air pressure of the interior volume 124 may be determined. The pressure sensor(s) 128 may be opportunistically positioned within the interior volume 124 or positioned within portions of the interior volume 124 where air pressure is expected to change most significantly in response to a force applied to the front cover 106. In some cases, the pressure sensor 128 may include a thin film which forms part of a capacitive sensor or a resistive sensor (e.g., a strain gauge). In some embodiments, the force sensor may include, or receive measurements from, one or more temperature sensors 136 that are configured to measure a temperature within the interior volume 124. Similarly to the pressure sensor(s), the temperature sensor(s) 136 may be opportunistically or purposefully positioned within the interior volume 124. In some cases, a temperature measurement acquired from a single temperature sensor 136 may adequately reflect the temperature within the interior volume 124. In other cases, temperature measurements from a set of multiple temperature sensors 136 may be combined to form an average (or mean) temperature, or a weighted average temperature (e.g., a temperature in which the temperature measurements made by one or more temperature sensors 136 are weighted more heavily than the temperature measurements made by one or more other temperature sensors 136). In some embodiments, the force sensor may use the measurement(s) of temperature made by the temperature sensor(s) 136, in combination with the measurements made by the pressure sensor(s) 128 and the air flow sensor 130, to determine the amount of force applied to the housing 102. The temperature sensor(s) may be positioned to generally measure the temperature within the interior volume 124, or to measure the temperature of heat sources (e.g., a processor) that affect the temperature within the interior volume 124.

A processor may be disposed within the interior volume 124, and in some cases may be part of (or coupled to) the stack 138. The processor may be configured to operate the touch sensor and/or force sensor. For example, the processor may be configured to receive, evaluate, propagate, or respond to signals obtained from the touch sensor or force sensor. The processor may also be configured to operate other components of the device 100, such as the display 104. The processor may include, for example, a single discrete processor, a distributed processor having multiple discrete components, or a set of processors, controllers, and/or other circuits that perform one or more processing functions.

The force sensor described with reference to FIGS. 1A-1C may determine an amount of force applied to the front cover 106 using a measurement of air pressure made by the pressure sensor 128 and a measurement of air flow made by the air flow sensor 130. In some cases, the amount of force applied to the front cover 106 may be further determined using a measurement of temperature made by the temperature sensor(s) 136. The amount of force applied to the front cover 106 may also be determined using a spring constant of the front cover 106. The spring constant may depend on the degree to which the front cover 106 flexes (which may be based on the material and/or dimensions of the front cover 106, as well as the items that are attached to the front cover 106), and the manner of attachment of the front cover 106 to the sidewall 118. In some cases, the spring constant may be a single value. In other cases, the spring constant may be determined based on a location or centroid of a touch detected on the front cover 106. For example, different touch locations or touch zones may be mapped to different spring constants, which different spring constants may reflect different behaviors of the front cover 106 under forces applied at different locations on the front cover 106 (e.g., the front cover 106 may behave differently when pressed near its center instead of near its perimeter).

In some embodiments, the amount of force applied to the front cover 106 or (display surface) at time t (i.e., F(t)) may be determined using the equation:

$$F(t)=(P_{inside}(t)-P_{outside})A+C_1(V_0-V(t))$$

which represents the sum of vertical forces on the front cover 106 from mechanical bending (linearized) and the resultant change in pressure within the interior volume 124. In the above equation, $P_{inside}(t)$ is a measurement of the air pressure within the interior volume 124, by the pressure sensor 128; $P_{outside}$ is a measurement of the air pressure external to the device 100 (e.g., the air pressure of the environment exterior to the device 100); A is the effective piston area of the front cover 106; $C_1$ is the afore-mentioned spring constant of the front cover 106; $V_0$ is the size of the interior volume 124 when no force is applied to the front cover 106; and V(t) is the size of the interior volume (which instantaneous volume may decrease in size as an amount of force applied to the front cover 106 increases). The value of $P_{outside}$ may be estimated for a particular altitude, obtained from weather information, or measured by a pressure sensor (e.g., a barometric pressure sensor) positioned in or adjacent a second port of the device 100.

The ideal gas equation states that:

$$P(t)V(t)=(t)RT(t)$$

where P(t) is the pressure within the interior volume 124; V(t) is the size of the interior volume 124; N(t) is a number of moles of gas (e.g., air) within the interior volume 124; R is a gas constant; and T(t) is a measurement of the temperature within the interior volume 124, as obtained by the temperature sensor(s) 136. Solving for volume yields the equation:

$$V(t) = \frac{N(t)RT(t)}{P(t)}$$

The number of moles of gas inside the interior volume 124 can be determined as a starting number of moles minus a number of moles measured by the air flow sensor 130:

$$N(t) = N_0 - \left(C_2 \int M(t)dt\right)$$

where $N_0$ is the starting number of moles; $C_2$ is a constant that converts the output of the air flow sensor 130 to moles; and M(t) is a measurement of air flow 134 by the air flow sensor 130 (e.g., an integration of all air flow through the port 132 (into and out of the interior volume 124) over a period of time).

Substituting the equation for N(t) into the equation for V(t), and substituting the equation for V(t) into the equation for F(t), yields the equation:

$$F(t) = (P_{inside}(t) - P_{outside})A + C_1\left\{V_0 - \frac{RT(t)}{P_{inside}(t)}\left(N_0 - C_2 \int M(t)dt\right)\right\}$$

In embodiments of the device 100 that do not include the temperature sensor(s) 136, the temperature of the interior volume 124 may be estimated based on one or more parameters, such as the number or type of components of the device 100 that are powered, the time that the components have been powered, the ambient temperature of the device 100 (i.e., the temperature of the environment exterior to the device 100), and/or the number of moles of air that have been recently expunged from and/or taken into the device 100 through the port 132.

Figure 2A:
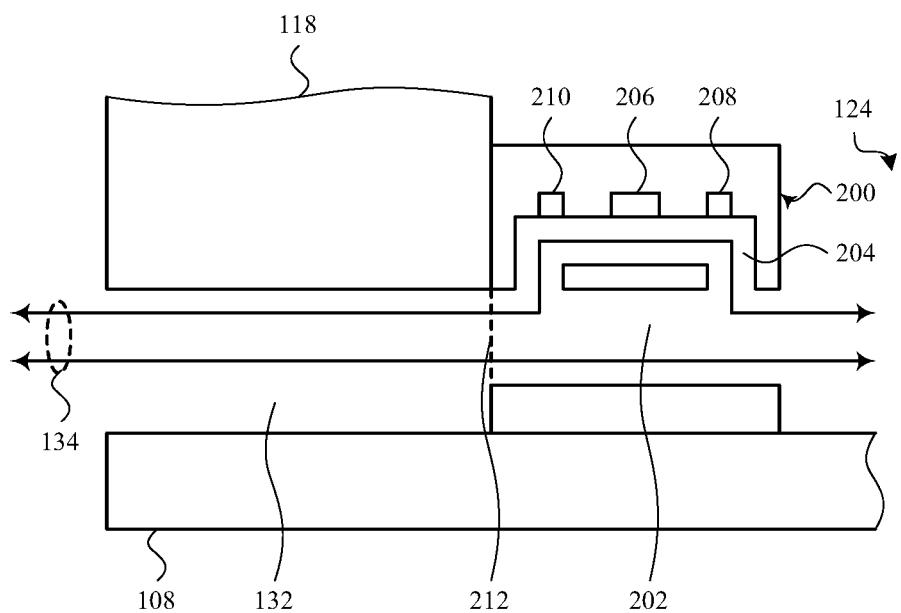
FIG. 2A shows an example embodiment of an air flow sensor.

Turning now to FIG. 2A, there is shown an example embodiment of an air flow sensor 200, which in some cases may be the air flow sensor 130 described with reference to FIG. 1C. In this example, the air flow sensor 200 is positioned adjacent an end of the port 132 described with reference to FIG. 1C (although the air flow sensor 200 could alternatively be positioned partially or wholly within the port 132). The air flow sensor 200 may include a main channel 202 and a bypass channel 204. A heater 206 may be positioned in or near the bypass channel 204, to heat air flowing through the bypass channel 204. A first temperature sensor 208 may be positioned in or near the bypass channel 204, closer to the interior volume 124, and a second temperature sensor 210 may be positioned in or near the bypass channel 204, closer to an environment exterior to the device 100.

An air permeable and liquid water impermeable membrane 212 may cover the port 132, and in some cases may be mounted adjacent an innermost end of the port 132. Alternatively, the membrane 212 may be positioned within the port 132, or adjacent an outermost end of the port 132. In some embodiments, the membrane 212 may be a hydrophobic membrane with small pores that allow air molecules, but not liquid water molecules, to pass.

Figure 2B:
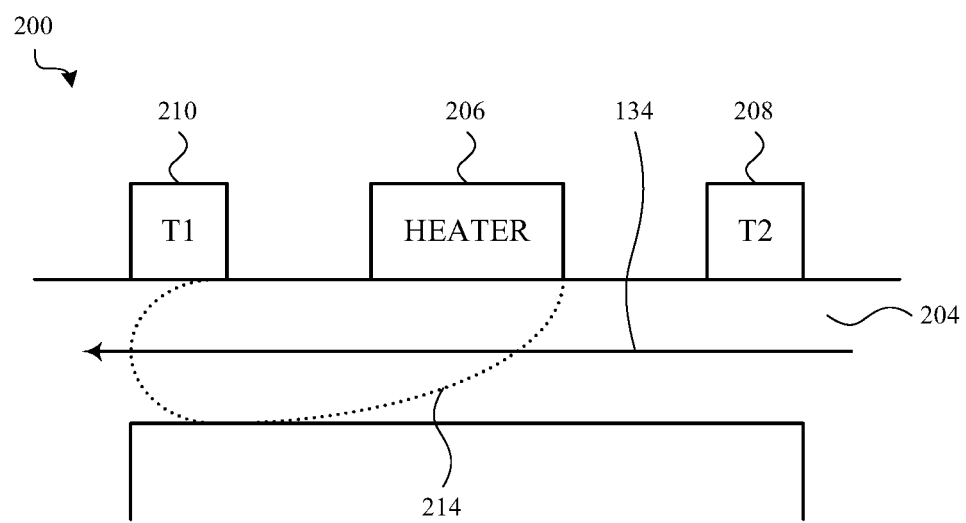
FIG. 2B shows an enlarged view of the components positioned in or near the bypass channel of the air flow sensor described with reference to FIG. 2A, and illustrates how the air flow sensor may detect air flow through the port.

FIG. 2B shows an enlarged view of the components positioned in or near the bypass channel 204 of the air flow sensor 200 described with reference to FIG. 2A, and illustrates how the air flow sensor 200 may detect air flow 134 through the port 132 shown in FIG. 2A. As shown, the heater 206 (e.g., a resistive filament that generates heat in response to a current applied to the filament) may heat at least a portion 214 of the air in the bypass channel 204, between the first and second temperature sensors 208, 210. When air exits the interior volume 124, in the direction shown, the air 214 heated by the heater 206 moves toward the second temperature sensor 210 and increases the temperature registered by the second temperature sensor 219 with respect to the temperature registered by the first temperature sensor 208. When air re-enters the interior volume 124, opposite the direction shown, the air heated by the heater 206 moves toward the first temperature sensor 208 and increases the temperature registered by the first temperature sensor 208 with respect to the temperature registered by the second temperature sensor 210. The amount and sign of the difference between the temperatures measured by the first and second temperature sensors 208, 210 can be used to determine a direction of air flow 134 and amount of air flow 134. The air flow sensor 200 can be considered a type of differential pressure sensor.

The air flow sensor 200 described with reference to FIGS. 2A & 2B, or a processor or other circuit connected to the air flow sensor 200, may integrate all air flow through the port 132 over a period of time, thereby enabling a determination of the number of moles of air that are within the interior volume 124 at any given point in time.

In some embodiments, a touch sensor (e.g., the touch sensor described with reference to FIG. 1C) may trigger a processor (e.g., the processor described with reference to FIG. 1C) to determine an amount of force applied to a surface of a housing through which a display is viewable (e.g., a surface of the front cover 106). For example, the processor may determine the amount of force in response to receiving, from the touch sensor, an indication of a touch on the surface. In some embodiments, the processor may determine the amount of force in response to receiving, from the touch sensor, an indication of a touch location (i.e., a location of a touch) or a touch centroid. The touch location may not only trigger a determination of the amount of force, but may also be used to identify a spring constant (e.g., the afore-mentioned constant $C_1$) that is to be used when determining the amount of force applied by a touch at the touch location.

In some embodiments, a processor may calibrate a force sensor that includes a pressure sensor and an air flow sensor. The calibration may be performed at a time when a touch sensor provides an indication of "no touch" on a surface of a housing through which a display is viewable. For example, the processor may calibrate values of $V_0$ and $\int M(t)dt$ when the touch sensor indicates a no touch condition.

Figure 3:
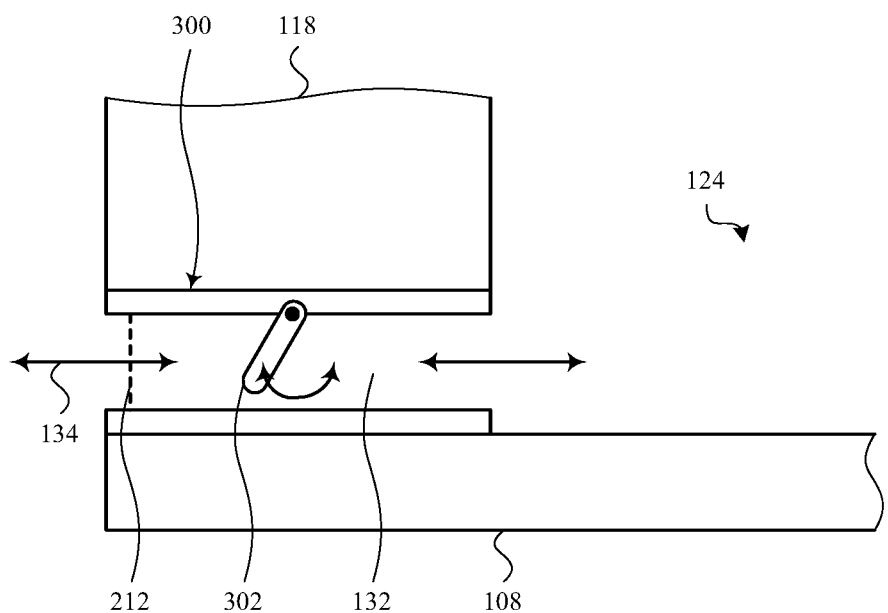
FIG. 3 shows another example embodiment of an air flow sensor.

FIG. 3 shows another example embodiment of an air flow sensor 300, which in some cases may be the air flow sensor 130 described with reference to FIG. 1C. In this example, the air flow sensor 300 is positioned partially or wholly within the port 132 (although the air flow sensor 300 may be alternatively positioned adjacent an end of the port 132). The air flow sensor 300 may include a movable member 302 (e.g., a flap connected to a pivot) that moves one way or another, and to a greater or lesser extent, in response to a direction and quantity of air flow 134 through the port 132.

Figure 4A:
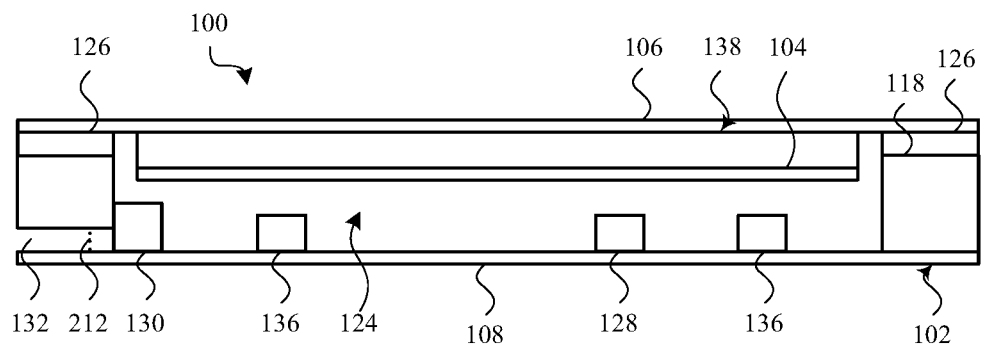
FIGS. 4A-4D show various example states of a sealed but vented device (e.g., the device described with reference to FIGS. 1A-1C)
Figure 4B:
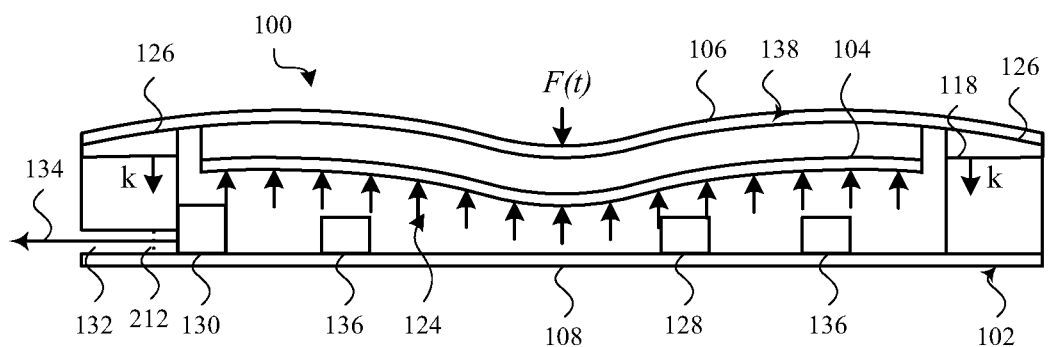
Figure 4C:
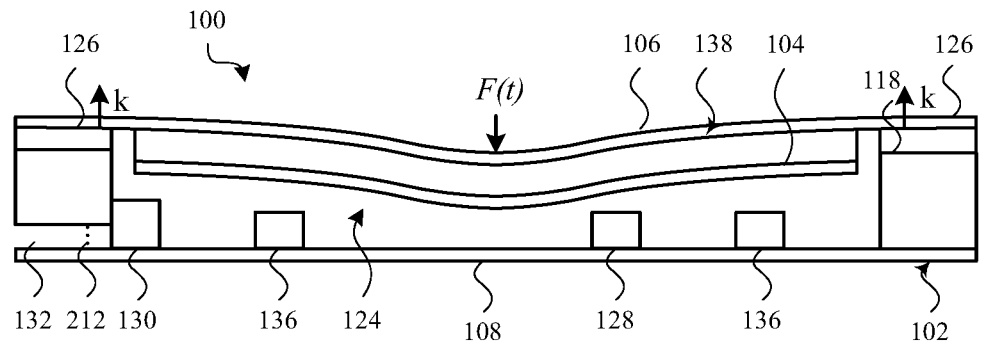
Figure 4D:
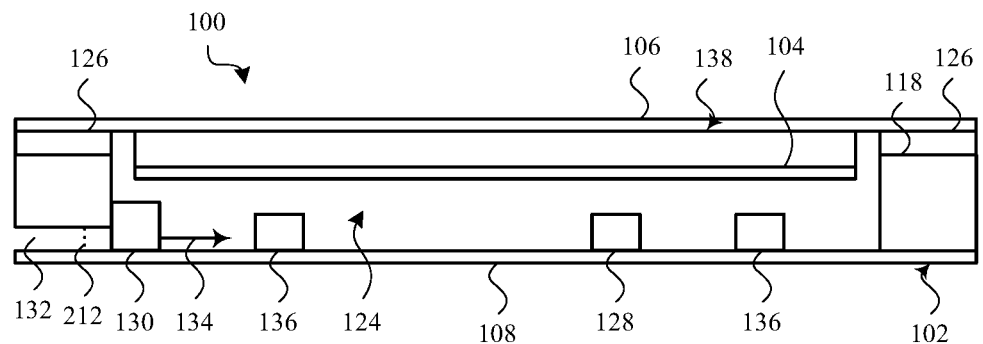

FIGS. 4A-4D show various example states of a sealed but vented device (e.g., the device 100 described with reference to FIGS. 1A-1C). The sealed but vented device 100 allows air within the interior volume 124 to escape and re-enter the device 100 through the port 132, but restricts the flow of air through the port 132 such that the air within the interior volume 124 acts as an air spring or piston that initially opposes a force applied to a display surface or front cover 106 of the device 100. FIG. 4A shows the device 100 in a steady state when a user is not touching the display surface or front cover 106. FIG. 4B shows the device 100 after a user has touched and begins to press on the display surface with a force F(t). As shown in FIG. 4B, the air within the interior volume 124 initially acts as an air spring that opposes the force F(t), but begins to exit the interior volume 124 through the port 132 (e.g., as air flow 134). FIG. 4C shows the device after the force F(t) has reached an arbitrary maximum and the air pressure within the interior volume 124 has reached a steady state (e.g., as a result of the force applied to the display surface being balanced by the increased air pressure within the interior volume 124 and the spring force of the front cover 106). In the state shown in FIG. 4C, air may cease to flow through the port 132. FIG. 4D shows the device 100 after the user has ceased applying the force F(t). As the device 100 returns to a steady state with no force being applied to the display surface, air may re-enter the interior volume 124 through the port 132 (e.g., as air flow 134).

Various operations may be performed, and determinations made, in the various states of the device 100 shown in FIGS. 4A-4D. For example, in the state shown in FIG. 4A, various aspects of the device's force sensor may be calibrated. In some cases, the calibrations may be performed in response to a touch sensor of the device 100 providing an indication of no touch on the display surface or front cover 106. In some cases, the calibrations may be performed in response to the air flow sensor 130 indicating no air flow for a period of time (or an integrated air flow of zero), and the pressure sensor 128 indicating a pressure that is equal to (or about equal to) an expected rest pressure within the interior volume 124. The calibrations may include, for example, setting the air flow integrated by the air flow sensor 130 to zero or setting an air pressure measured by the pressure sensor 128 to a resting air pressure of the interior volume 124. A determined force F(t) at the resting air pressure may also be set to zero.

In the state shown in FIG. 4B, the pressure sensor 128 may be used to obtain one or more measurements of air pressure within the interior volume 124, and the air flow sensor 130 may be used to obtain one or more instantaneous air flow measurements or determine an integration of all air flow through the port 132 up to the time the air pressure measurement is obtained. A processor of the device 100 may determine whether a relationship between a measurement (or measurements) of the air pressure and a measurement (or measurements) of the air flow matches an expected air pressure to air flow relationship. When the relationship between the measurement(s) of the air pressure and the measurement(s) of the air flow do not match the expected air pressure to air flow relationship (e.g., when there is an air flow but no air pressure), the processor may determine that the device 100 has a damaged seal (e.g., a damaged gasket 126 or cracked front cover 106) and perform one or more operations, such as transmitting a notification to a user of the device 100. In some cases, the notification may include a warning that the interior volume 124 is no longer sealed. The warning may be viewable through the display surface. In some cases, the notification may include a sound, a voice alert, or a haptic output.

In the case of a severely damaged seal, the air pressure within the interior volume 124 may not change (or minimally change) in response to a force applied to the display surface. Similarly, the air flow sensor 130 may not register an air flow (or register a minimal air flow). Thus, in the case of a severely damaged seal, a measurement (or measurements) obtained from just the pressure sensor 128 or just the air flow sensor 130 when a user is determined to be touching the display surface (e.g., because of a touch indication provided by a touch sensor) may be sufficient for a processor to determine that the device 100 has a damaged seal.

Figure 5:
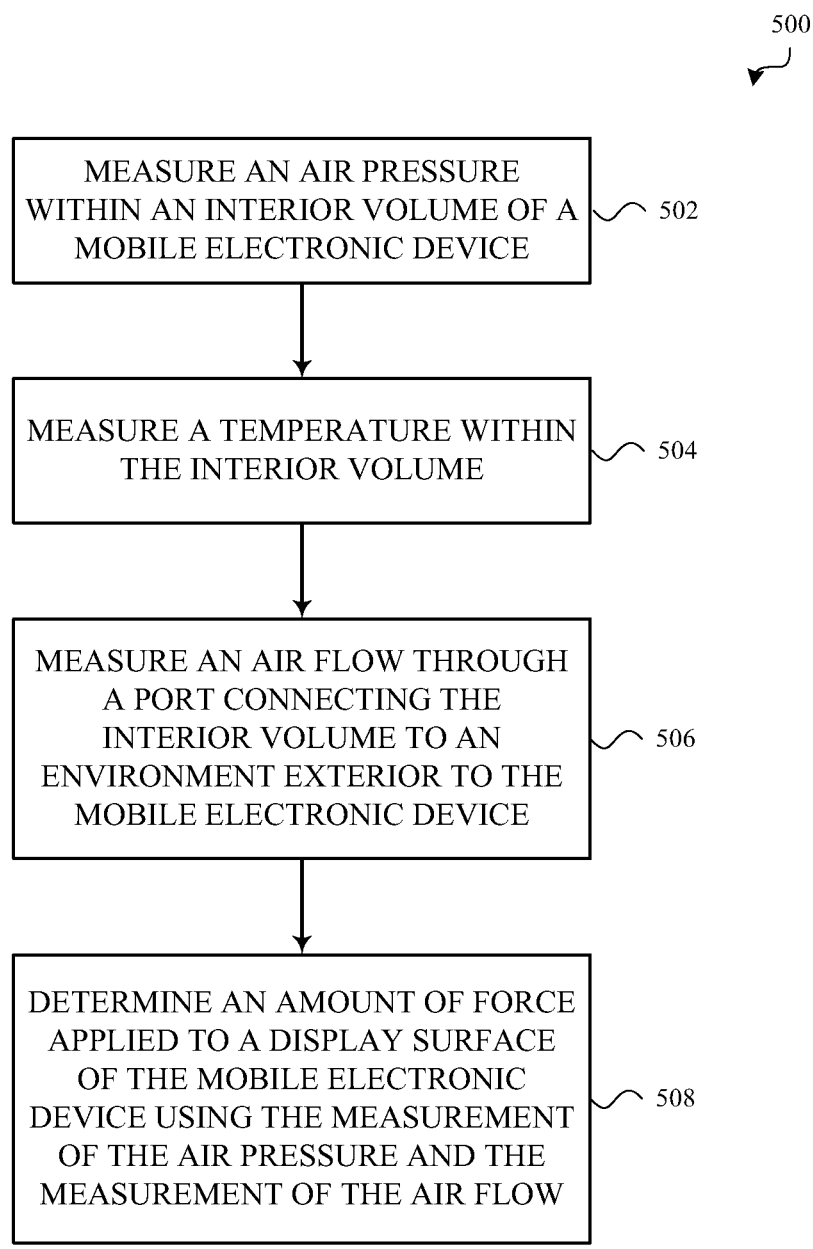
FIG. 5 illustrates an example method of determining an amount of force applied to a display surface of a mobile electronic device.

FIG. 5 illustrates an example method 500 of determining an amount of force applied to a display surface of a mobile electronic device. The method 500 may be performed by, or using, any of the force sensors and/or processors described herein. The method 500 may also be performed by, or using, other force sensors or processors.

At block 502, the method 500 may include measuring an air pressure within an interior volume of the mobile electronic device. The operation(s) at block 502 may be performed by one or more of the pressure sensors described herein.

At block 504, the method 500 may optionally include measuring a temperature within the interior volume. The operation(s) at block 504 may be performed by one or more of the temperature sensors described herein.

At block 506, the method 500 may include measuring an air flow through a port connecting the interior volume to an environment exterior to the mobile electronic device. In some embodiments, measuring the air flow through the port may include integrating all air flow through the port over a period of time. The operation(s) at block 506 may be performed by one or more of the air flow sensors described herein.

At block 508, the method 500 may include determining the amount of force applied to the display surface using the measurement of the air pressure and the measurement of the air flow, and optionally the measurement of the temperature. The operation(s) at block 508 may be performed by one or more of the processors described herein.

In some embodiments, the method 500 may include monitoring the display surface for touches (e.g., using a touch sensor of the mobile electronic device), and determining the amount of force applied to the display surface in response to detecting a touch on the display surface. In some embodiments, the operations at block 502, 504, and/or 506 may also be performed in response to detecting the touch on the display surface.

In some embodiments, the method 500 may include calibrating an air flow sensor that is used to measure the air flow through the port. The calibration may be performed in response to detecting no touch on the display surface.

Figure 6:
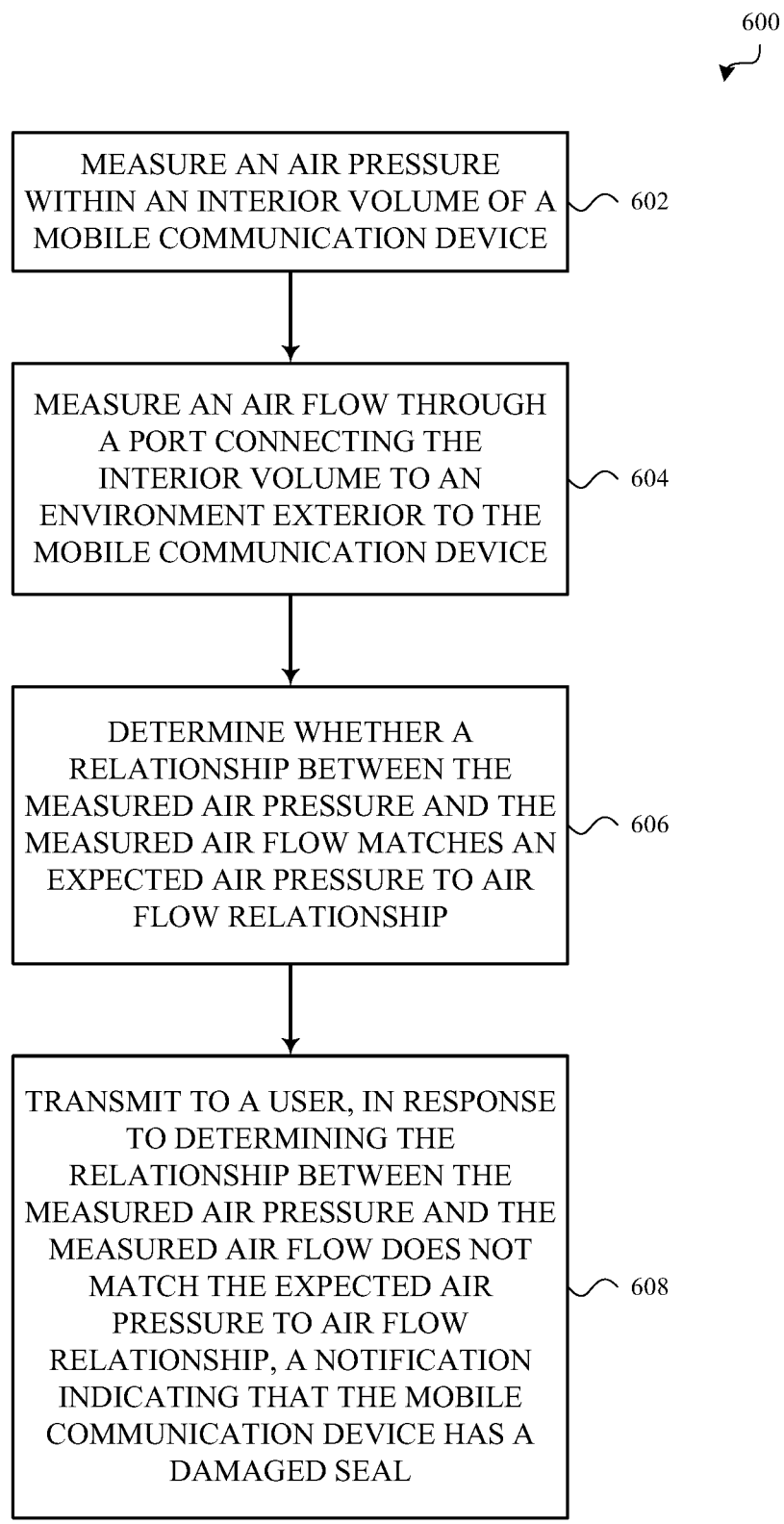
FIG. 6 illustrates an example method of notifying a user of a mobile communication device that the mobile communication device has a damaged seal.

FIG. 6 illustrates an example method 600 of notifying a user of a mobile communication device that the mobile communication device has a damaged seal. The method 600 may be performed by, or using, any of the force sensors and/or processors described herein. The method 600 may also be performed by, or using, other force sensors or processors.

At block 602, the method 600 may include measuring an air pressure within an interior volume of the mobile communication device. The operation(s) at block 602 may be performed by one or more of the pressure sensors described herein.

At block 604, the method 600 may include measuring an air flow through a port connecting the interior volume to an environment exterior to the mobile communication device. In some embodiments, measuring the air flow through the port may include integrating all air flow through the port over a period of time. The operation(s) at block 604 may be performed by one or more of the air flow sensors described herein.

At block 606, the method 600 may include determining whether a relationship between the measured air pressure and the measured air flow matches an expected air pressure to air flow relationship. The operation(s) at block 606 may be performed by one or more of the processors described herein.

At block 608, the method 600 may include transmitting to the user, in response to determining the relationship between the measured air pressure and the measured air flow does not match the expected air pressure to air flow relationship, a notification indicating that the mobile communication device has the damaged seal. In some embodiments, the notification may include a visual notification displayed on a display of the mobile communication device. In some cases, the notification may include a sound, a voice alert, or a haptic output. The operation(s) at block 608 may be performed by one or more of the processors described herein.

In some embodiments, the method 600 may include detecting a touch on a display surface of the mobile communication device (e.g., using a touch sensor of the mobile electronic device), and determining whether the relationship between the measured air pressure and the measured air flow matches the expected air pressure to air flow relationship in response to detecting the touch on the display surface. In some embodiments, the operations at block 602 and/or 604 may also be performed in response to detecting the touch on the display surface.

Figure 7:
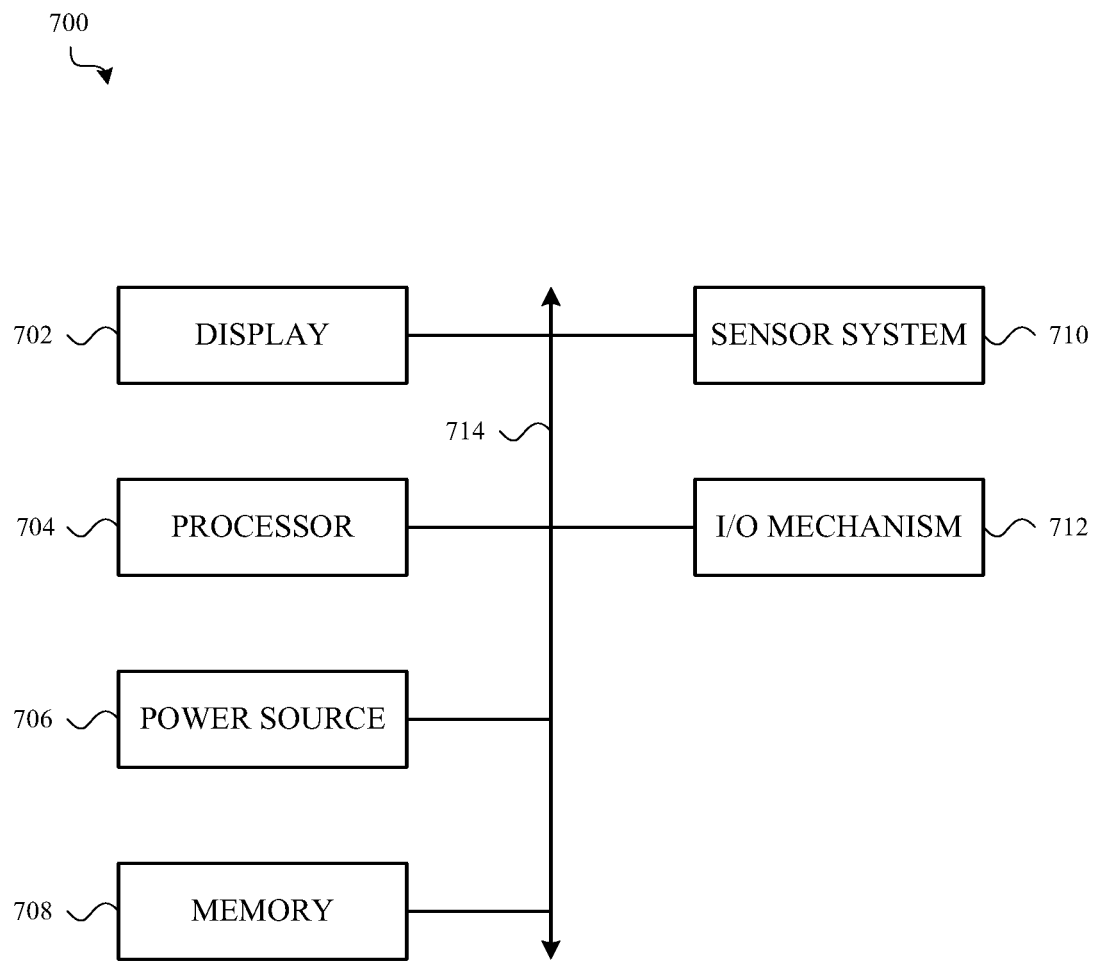
FIG. 7 shows a sample electrical block diagram of an electronic device.

FIG. 7 shows a sample electrical block diagram of an electronic device 700, which may be the electronic device described with reference to FIGS. 1A-1C. The electronic device 700 may include a display 702 (e.g., a light-emitting display), a processor 704, a power source 706, a memory 708 or storage device, a sensor system 710, and an input/ output (I/O) mechanism 712 (e.g., an input/output device and/or input/output port). The processor 704 may control some or all of the operations of the electronic device 700. The processor 704 may communicate, either directly or indirectly, with substantially all of the components of the electronic device 700. For example, a system bus or other communication mechanism 714 may provide communication between the processor 704, the power source 706, the memory 708, the sensor system 710, and/or the input/output mechanism 712.

The processor 704 may be implemented as any electronic device capable of processing, receiving, or transmitting data or instructions. For example, the processor 704 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. In some embodiments, the processor 704 may include or be an example of the processor described with reference to FIG. 1C.

In some embodiments, the components of the electronic device 700 may be controlled by multiple processors. For example, select components of the electronic device 700 may be controlled by a first processor and other components of the electronic device 700 may be controlled by a second processor, where the first and second processors may or may not be in communication with each other.

The power source 706 may be implemented with any device capable of providing energy to the electronic device 700. For example, the power source 706 may be one or more batteries or rechargeable batteries. Additionally or alternatively, the power source 706 may be a power connector or power cord that connects the electronic device 700 to another power source, such as a wall outlet.

The memory 708 may store electronic data that may be used by the electronic device 700. For example, the memory 708 may store electrical data or content such as, for example, audio and video files, documents and applications, device settings and user preferences, timing signals, control signals, data structures or databases, image data, or focus settings. The memory 708 may be configured as any type of memory. By way of example only, the memory 708 may be implemented as random access memory, read-only memory, Flash memory, removable memory, other types of storage elements, or combinations of such devices.

The electronic device 700 may also include one or more sensors defining the sensor system 710. The sensors may be positioned substantially anywhere on the electronic device 700. The sensor(s) may be configured to sense substantially any type of characteristic, such as but not limited to, touch, force, pressure, air flow, temperature, light, heat, movement, relative motion, biometric data, and so on. For example, the sensor system 710 may include a touch sensor, a force sensor, a temperature sensor, a position sensor, a light or optical sensor, an accelerometer, a pressure sensor (e.g., a pressure transducer), an air flow sensor, a gyroscope, a magnetometer, a health monitoring sensor, and so on. Additionally, the one or more sensors may utilize any suitable sensing technology, including, but not limited to, capacitive, ultrasonic, resistive, optical, ultrasound, piezoelectric, and thermal sensing technology. In some embodiments, the sensor(s) may include the touch sensors, pressure sensors, air flow sensors, temperature sensors, and other sensors described herein.

The I/O mechanism 712 may transmit and/or receive data from a user or another electronic device. An I/O device may include a display, a touch sensing input surface such as a track pad, one or more buttons (e.g., a graphical user interface "home" button, or one of the buttons described herein), one or more cameras, one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 712 may also provide feedback (e.g., a haptic output) to a user, and may include the haptic engine of any of the modules or button assemblies described herein.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A device, comprising:
   a housing defining an interior volume and a port connecting the interior volume to an environment exterior to the device;
   a display viewable through a surface of the housing;
   a pressure sensor configured to measure an air pressure within the interior volume;
   an air flow sensor configured to measure an air flow through the port; and
   a processor configured to determine an amount of force applied to the housing using a measurement of the air pressure by the pressure sensor and a measurement of the air flow by the air flow sensor.

2. The device of claim 1, further comprising:
   a temperature sensor configured to measure a temperature within the interior volume; wherein:
   the processor is further configured to determine the amount of force applied to the housing using a measurement of the temperature by the temperature sensor.

3. The device of claim 2, wherein:
   the temperature is a first temperature, and the temperature sensor is a first temperature sensor;
   the device further comprises a second temperature sensor configured to measure a second temperature within the interior volume; and
   the processor is further configured to determine the amount of force applied to the housing using a measurement of the second temperature by the second temperature sensor.

4. The device of claim 1, further comprising:
   an air permeable and liquid water impermeable membrane covering the port.

5. The device of claim 1, wherein the air flow sensor comprises a differential pressure sensor.

6. The device of claim 1, wherein the air flow sensor comprises a movable member.

7. The device of claim 1, further comprising:
a touch sensor disposed under the surface of the housing through which the display is viewable; wherein:
the processor is further configured to determine the amount of force applied to the housing using a location of a touch provided by the touch sensor.

8. The device of claim 7, wherein:
the processor is further configured to calibrate the air flow sensor; and
the processor performs the calibration when the touch sensor provides an indication of no touch on the surface of the housing through which the display is viewable.

9. The device of claim 7, wherein:
the processor is configured to determine the amount of force applied to the housing in response to the touch sensor indicating a touch on the surface of the housing through which the display is viewable.

10. The device of claim 1, wherein the processor is configured to:
determine whether a relationship between the measurement of the air pressure and the measurement of the air flow matches an expected air pressure to air flow relationship; and
transmit to a user, in response to determining the relationship between the measured air pressure and the measured air flow does not match the expected air pressure to air flow relationship, a notification indicating that the device has a damaged seal.

11. The device of claim 1, wherein the measurement of the air flow comprises an integration of all air flow through the port over a period of time.

12. A method of determining an amount of force applied to a display surface of a mobile electronic device, comprising:
measuring an air pressure within an interior volume of the mobile electronic device;
measuring an air flow through a port connecting the interior volume to an environment exterior to the mobile electronic device; and
determining the amount of force applied to the display surface using the measurement of the air pressure and the measurement of the air flow.

13. The method of claim 12, further comprising:
measuring a temperature within the interior volume; wherein:
the amount of force applied to the display surface is further determined using the measurement of the temperature.

14. The method of claim 12, further comprising:
monitoring the display surface for touches; wherein:
the amount of force applied to the display surface is determined in response to detecting a touch on the display surface.

15. The method of claim 14, further comprising:
calibrating an air flow sensor, used to measure the air flow through the port, in response to detecting no touch on the display surface.

16. The method of claim 12, wherein measuring the air flow through the port comprises:
integrating all air flow through the port over a period of time.

17. A method of notifying a user of a mobile communication device that the mobile communication device has a damaged seal, comprising:
measuring an air pressure within an interior volume of the mobile communication device;
measuring an air flow through a port connecting the interior volume to an environment exterior to the mobile communication device;
determining whether a relationship between the measured air pressure and the measured air flow matches an expected air pressure to air flow relationship; and
transmitting to the user, in response to determining the relationship between the measured air pressure and the measured air flow does not match the expected air pressure to air flow relationship, a notification indicating that the mobile communication device has the damaged seal.

18. The method of claim 17, wherein measuring the air flow through the port comprises:
integrating all air flow through the port over a period of time.

19. The method of claim 17, further comprising:
detecting a touch on a display surface of the mobile communication device; wherein:
the determination of whether the relationship between the measured air pressure and the measured air flow matches the expected air pressure to air flow relationship is made in response to detecting the touch on the display surface.

20. The method of claim 17, wherein the notification comprises a visual notification displayed on a display of the mobile communication device.

* * * * *